Dec. 15, 1925.　　　　　　　　　　　　　　　　　　　　　1,566,151
J. F. McDONOUGH
MANUFACTURE OF BREAD AND THE LIKE
Filed Oct. 25, 1923　　　　2 Sheets-Sheet 1
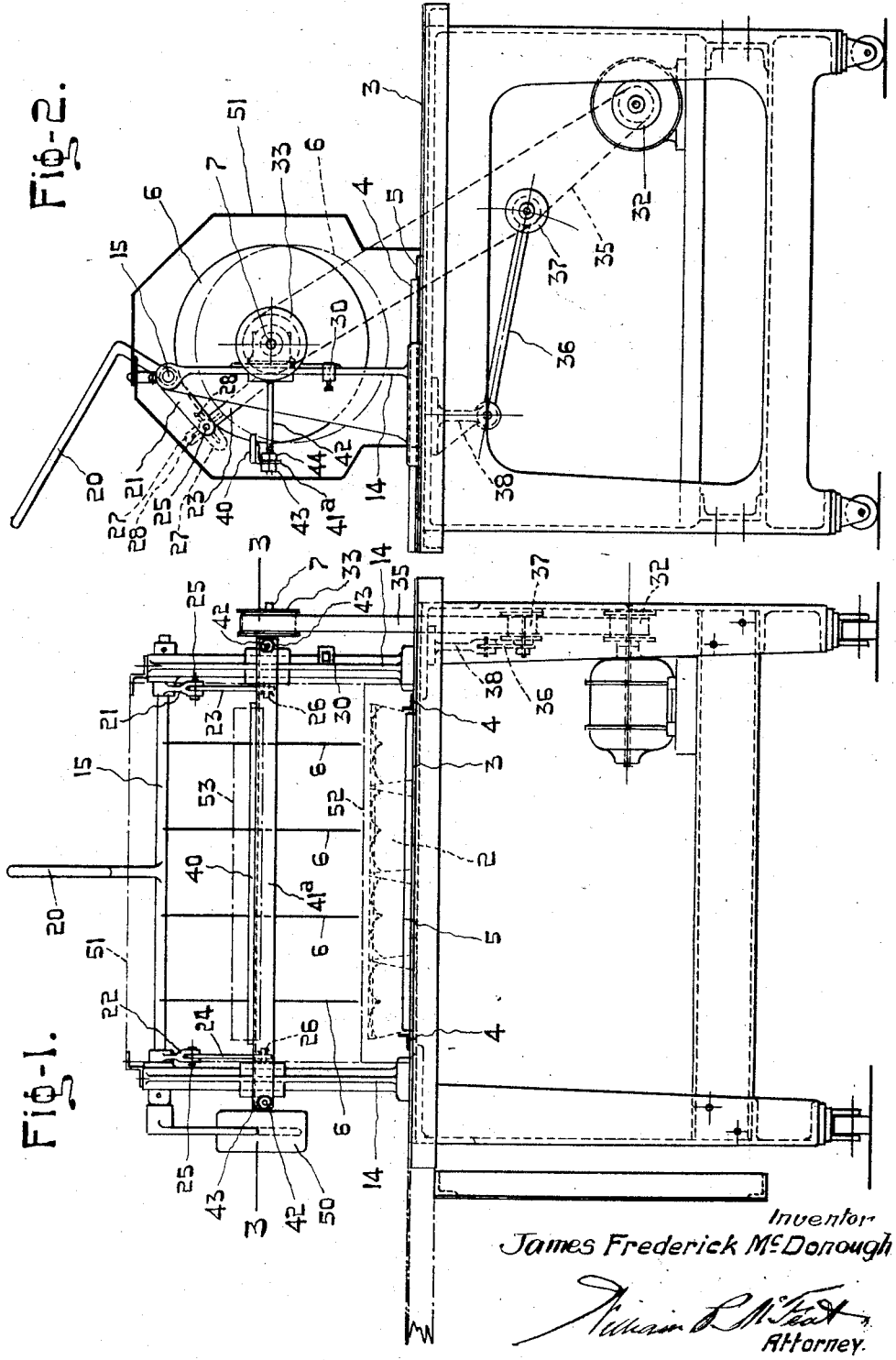
Inventor
James Frederick McDonough
Attorney.

Dec. 15, 1925.  
J. F. McDONOUGH  
1,566,151  
MANUFACTURE OF BREAD AND THE LIKE  
Filed Oct. 25, 1923  
2 Sheets-Sheet 2
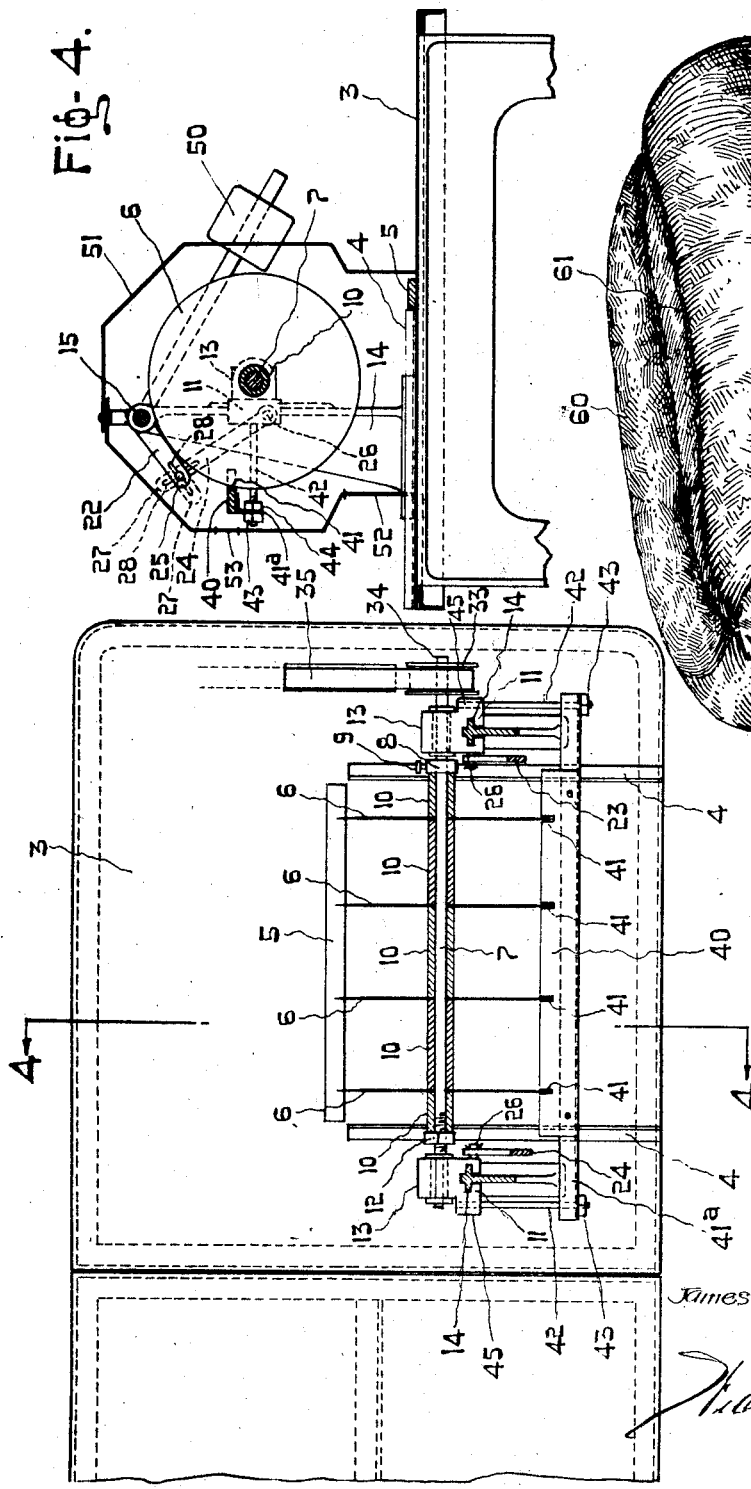
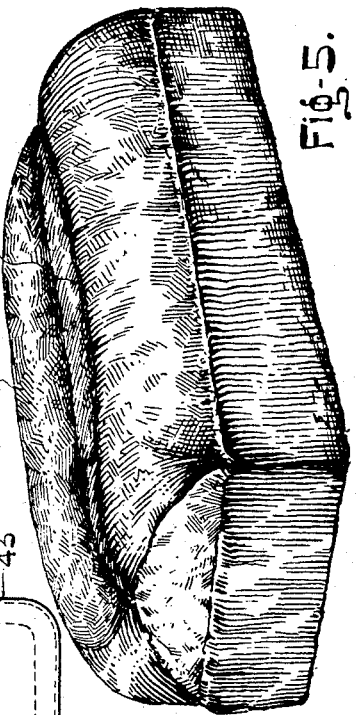
Inventor  
James Frederick McDonough  
Attorney.

Patented Dec. 15, 1925.

1,566,151

UNITED STATES PATENT OFFICE.

JAMES FREDERICK McDONOUGH, OF MONTREAL, QUEBEC, CANADA, ASSIGNOR TO JAMES M. AIRD LIMITED, OF MONTREAL, QUEBEC, CANADA.

MANUFACTURE OF BREAD AND THE LIKE.

Application filed October 25, 1923. Serial No. 670,672.

*To all whom it may concern:*

Be it known that I, JAMES FREDERICK MC-DONOUGH, of the city of Montreal, Province of Quebec, Dominion of Canada, a subject of the King of Great Britain, have invented certain new and useful Improvements in the Manufacture of Bread and the like; and I do hereby declare that the following is a clear, full, and exact description thereof.

My invention relates particularly to the method and apparatus for making a cut or split in the top of a loaf of bread.

Heretofore in the baking of bread it has been and in fact still is, the practice to make a cut usually longitudinally in the top of each loaf just before it is baked for the purpose of adding to the flavor of the loaf and providing a more decorative top.

As this cut has been made by hand and had to be made during the travel of the dough it has been practically impossible to secure a cut which is straight and of uniform depth and which will obtain the desired texture and "shred" in the finished loaf.

The object of the present invention is to overcome these defects and to provide means which will make the desired cut irrespective of the consistency of the dough, which when the loaf is baked, will impart to the top of the loaf adjacent the cut a finely shredded ornamental design, and by which a plurality of cuts may be made simultaneously.

For full comprehension, however of my invention, reference must be had to the accompanying drawings in which similar reference characters indicate the same parts, and wherein:

Figure 1 is a front elevation of a machine constructed according to my invention;

Figure 2 is an end elevation;

Figure 3 is a horizontal sectional view taken on line 3—3 Figure 1;

Figure 4 is a transverse sectional view taken on line 4—4 Figure 3; and

Figure 5 is a detail perspective view of a finished loaf.

The machine illustrated is but one embodiment of the invention and may be modified in the manner hereinafter described without departing from the spirit of the invention.

The dough after it has been "proved" may be fed to position to be cut, by hand, or automatically by an intermittently operated carrier, the feed taking place during the intervals between the cutting strokes of the knives which may be raised and lowered automatically.

In the present embodiment a unit 2 of several pans of dough, four being illustrated, is fed by hand upon a table 3 between guides 4 secured thereon to the cutting position, the latter being determined by a transverse stop 5 also secured upon the table.

In this position each pan of dough is located beneath a circular disc knife 6 of which there are four. These knives are rigidly secured upon and rotatable with a horizontal shaft 7 and with the latter are adapted to be moved vertically as a unit to and from cutting relation with the dough. They are spaced apart and detachably clamped upon the shaft by a collar 8 secured upon the latter adjacent one end thereof by a set-screw 9, sleeves 10 encircling the shaft and spacing the knives from the collar, and from each other and from a nut 12 screwed upon the opposite end of the shaft, the nut when tightened clamping the whole against the collar. The ends of the shaft 7 are journalled in bearings in laterally extending lugs 13 on collars 11 which encircle and are vertically slidable upon vertical standards or posts 14. The latter are secured at their lower ends upon the table or base 3 and their upper ends rotatably support a stationary shaft 15 also disposed horizontally and located above the knives at a point which will not interfere with the vertical movement of the latter. This last mentioned shaft at a point substantially midway its length carries an upwardly projecting lever 20 by which it is manually rotated for the purpose of lowering or raising the knives, the rotary movement of the shaft being translated into vertical movement of the knives by arms 21 and 22 rigidly secured upon the shaft at opposite ends thereof and links 23 and 24 pivotally connected at their upper ends to the arms as at 25 and at their lower ends to the collars 11 as at 26.

If it is desired to provide for adjustment of the depth of the cut the arms and links may be elongated at any of their pivotal connections as at 27 and slotted as at 26 or the shaft 15 and dough supporting means may be made relatively adjustable, or an adjustable top 30 may be secured upon one or both of the posts.

The knives are driven at preferably a high velocity by a driving pulley 32 deriving its power from a motor 32ª mounted on a shelf 3ª carried by the legs 3ᵇ of the table, a driven pulley 33 keyed upon one side of the shaft which is extended beyond its bearing as at 34 and a belt 35 encircling the pulleys. The belt is maintained under constant tension irrespective of the position of the knives by an idler 37 rotatably carried by the free end of a gravity arm 37 hinged at its opposite end in a bracket 38 secured upon the underside of the table top.

In order to keep the knives clean so that the tendency of the dough to adhere thereto will be reduced to a minimum a scraper 40 is mounted upon the collars 11 and is adapted to move in unison therewith. This scraper consists of a wooden strip having notches 41 to snugly receive the edges of the knives. This strip is secured upon the top of an angle iron 41 which is detachably clamped upon bolts 42 by nuts 43 and 44, the bolts being mounted in bosses 45 on the collars.

The weight of the vertically movable knife unit is counterbalanced by a counter-weight 50 secured upon one end of the shaft 15 and the knife unit is encased in a housing 51 of sheet metal or wire netting having an opening 52 at its bottom to provide a passage for the dough pans and a longitudinal slot 53 at its middle through which the operator may have access to the knives and scraper.

Operation.

During the travel of the pans from the "prover" to the ovens they are fed in groups or units to position beneath the knives. The latter which are rotating at a high speed are then brought down into cutting relation with the dough in each pan forming a straight longitudinal cut or split in the top thereof to a predetermined depth. The speed of rotation is so great that a clean cut is obtained with minimum displacement of the dough.

The texture of the resultant loaf is consequently finer and more uniform than that of the loaf which is cut by hand and the appearance of the top of the loaf is greatly improved, the top edges 60 and 61 of the cut assuming uniform curves as illustrated in Figure 5 and the bread at the middle or bottom of the cut forming an artistic shredded design.

Each cut is completed almost instantaneously, the knives being raised immediately after the collars 11 engage the stops 30.

What I claim is as follows:—

1. In a machine of the type described, a pair of spaced vertical standards, a collar encircling each standard and slidable vertically thereon, a shaft having its ends journalled in said collars, a plurality of circular knives rigidly mounted upon the shaft and rotatable thereon, means for rotating the shaft, a second shaft having its ends rotatably mounted in the standards, an arm rigidly mounted upon each end of the second shaft, links pivotally connected at their upper ends to the arms and at their lower ends to the collars and means for rotating the second shaft for the purpose of lowering or raising the knives.

2. In a machine of the type described, a table, a pair of spaced vertical standards secured upon the table, collars vertically slidable upon each standard, each collar having a laterally extending lug, a horizontal shaft having its ends journalled in said lugs, a plurality of circular knives mounted upon said shaft and rotatable in unison therewith, a scraper consisting of a horizontal member disposed parallel to said shaft and having a series of notches in one side adapted to receive the edges of the knives, means for supporting the scraper upon the collars and permitting adjustment of the scraper relatively to the knives, means for raising and lowering the shaft, knives and scraper relatively to the table, and means for rotating the shaft.

3. In a machine of the type described, a table, a pair of spaced vertical standards secured upon the table, collars vertically slidable upon each standard, each collar having a laterally extending lug, a horizontal shaft having its ends journalled in said lugs, a plurality of circular knives mounted upon said shaft and rotatable in unison therewith, a scraper consisting of a horizontal member disposed parallel to said shaft and having a series of notches in one side adapted to receive the edges of the knives, means for supporting the scraper upon the collars and permitting adjustment of the scraper relatively to the knives, said last mentioned means consisting of bolts carried by the collars and nuts encircling the bolts and detachably clamping the scraper thereon, means for raising and lowering the shaft, knives and scraper relatively to the table, and means for rotating the shaft.

4. In a machine of the type described, a table, a pair of spaced vertical standards secured upon the table, collars vertically slidable upon each standard, each collar having a laterally extending lug, means for raising and lowering the shaft and knives relatively to the table, said means consisting of a second horizontal shaft having its ends mounted in the upper ends of the standards, an operating lever for turning said second shaft, said lever being of angular form having one end secured to the second shaft midway the length of the latter, arms secured upon the said second shaft adjacent opposite ends of the latter and extending at right angles thereto, and link members connected at their lower ends to the collars and at their upper ends to the free ends of the arms, said last-mentioned connection being adjustable, and means for rotating the first-mentioned shaft.

5. In a machine of the type described, a table, a pair of spaced vertical standards secured upon the table, collars vertically slidable upon each standard, each collar having a laterally extending lug, a horizontal shaft having its ends journalled in said lugs, a plurality of circular knives mounted upon said shaft, and rotatable in unison therewith, a scraper consisting of a horizontal member disposed parallel to said shaft and having a series of notches in one side adapted to receive the edges of the knives, means for supporting the scraper upon the collars and permitting adjustment of the scraper relatively to the knives, said last mentioned means consisting of bolts carried by the collars and nuts encircling the bolts and detachably clamping the scraper thereon, means for raising and lowering the shaft, knives and scraper relatively to the table, said means consisting of a second horizontal shaft having its ends mounted in the upper ends of the standards, an operating lever for turning said second shaft, said lever being of angular form having one end secured to the second shaft midway its length, arms secured upon the said second shaft adjacent opposite ends of the latter and extending at right angles thereto, and link members connected at their lower ends to the collars and at their upper ends to the free ends of the arms, said last mentioned connection being adjustable, and means for rotating the first mentioned shaft.

In testimony whereof I have signed my name to this specification.

JAMES FREDERICK McDONOUGH.